Sept. 2, 1941.  B. C. PLACE  2,254,311
SECURING MOLDINGS
Filed March 13, 1939

Inventor
Bion C. Place

By Strauch & Hoffman
Attorneys

Patented Sept. 2, 1941

2,254,311

UNITED STATES PATENT OFFICE 2,254,311

SECURING MOLDINGS

Bion C. Place, Detroit, Mich., assignor of one-half to George E. Gagnier, Detroit, Mich.

Application March 13, 1939, Serial No. 261,605

1 Claim. (Cl. 189—88)

The present invention is concerned with the securing of moldings by means of spring stud fasteners. More particularly, the invention is concerned with a spring stud fastener especially designed to properly secure moldings either by first bringing about an engagement between the fastener heads and the moldings and then engaging the stud or entering parts with the supporting structure, or by first applying the fasteners to the supporting structure and then snapping the molding in engagement with the fastener heads protruding away from said structure.

Hollow sheet metal moldings now widely used on various parts of automobiles, as customarily constructed, include relatively wide spaced inturned flanges, and they assume various shapes and sizes. Inasmuch as it is essential that the fasteners retain the moldings firmly against the supporting structure, and from movement with respect to the fasteners, difficulties are presented that have heretofore resulted in the special design of many kinds of fasteners, each adapted only for a molding of a particular kind, shape and size.

At the present time, two methods are generally followed in securing moldings to automobile structures by means of spring stud fasteners. In the first method, the fasteners are first assembled in spaced intervals along the length of the molding generally by sliding the fastener to its intended position from one end of the molding. The other method, frequently employed, involves the insertion of the entering parts of the spring stud fasteners in the apertures in the support and the subsequent snapping of the molding on the heads of the fasteners, the latter method being frequently used particularly in situations in which it is difficult to apply the molding in any other manner because of the relatively inaccessible position thereof for adjustment of the fasteners with respect to the molding. Different fasteners are now employed depending on which method of attaching the moldings is used.

A primary purpose of the present invention is to provide a spring stud fastener having a head of such construction that similar fasteners can be used to satisfactorily secure moldings regardless of whether the practice of first engaging the fastener with the molding is followed, or the practice of first engaging the stud part of the fastener with the supporting structure, whereby the same fastener can be used whichever method of assembly is employed.

A further object of the invention is to provide a molding constructed along its longitudinal edges with hollow bead-like formations, instead of the customary flanges of varying width, and to so design the bead formation that grooves are provided of a depth and width just sufficient to snugly receive edges of the fastener head whereby economies in a saving of metal result and, at the same time, the molding is provided in a form capable of being immovably secured regardless of the method followed in effecting the assembly.

A still further object of the invention is to provide a spring stud fastener constructed of a single piece of wire, a portion of which forms the head of the fastener and the remainder of which is utilized in the formation of the shank, in which the head is made of ovoidal form peculiarly adapting the fastener head for rotative assembly with respect to the molding or of having the molding snapped upon the fastener head.

A still further object of the invention is to provide an improved molding having a bead-like formation along its longitudinal edges so shaped as to provide longitudinal grooves facing each other having a width corresponding to the diameter of the wire from which the fastener is constructed and a depth corresponding to the radius of said wire, and so that when the fastener is assembled with respect to the molding, the under surface of the fastener head lies substantially in the plane of the under surfaces of the bead-like formation thus insuring contact between the underside of the fastener head and the undersurfaces of the bead-like formations with the supporting structure when the assembly has been completed.

This invention also aims to provide an improved combination of supporting structure, a molding having beads formed along its longitudinal edges, and wire spring stud fasteners retaining the molding upon the supporting structure.

Still further objects of the invention will appear as the description thereof proceeds with reference to the accompanying drawing in which.

Like reference characters indicate like parts throughout the specification.

Figure 1:
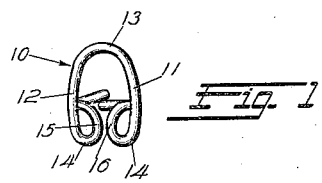
Figures 1, 2 and 3 are respectively plan, end and side elevational views of the improved fastener constituting a part of the present invention.

The improved molding fastener of the present invention is preferably constructed of wire that is circular in cross section each fastener being formed from a single piece of wire by bending a portion thereof to form the head and other portions to form the shank or stud part. Preferably the head is formed from the mid-portion of the piece of wire by bending it into the form of a loop 10 of elongated form, providing relatively straight portions 11 and 12 connected together at one end by a rounded portion 13. Portions 11 and 12 are bent inwardly toward each other as shown at 14 and carry respectively arms 15 and 16 arranged in the plane of the head or substantially so. The arms 15 and 16 carry the legs 17 and 18, respectively constituting the shank or stud part of the fastener. The legs 17 and 18 are outwardly bowed and their ends are disposed in overlapped relation so that they can pass each other in scissors fashion. The shank just described is like that of the fastener illustrated in Patent No. 1,679,266, granted July 30, 1928, and functions in the same manner.

The present invention contemplates moldings which differ from those customarily employed in that instead of having inturned flanges of substantial width, the longitudinal edges of the moldings are provided with bead-like formations. In the drawing 19 designates the body of a molding of the character just stated. Said body may assume any desired form and width. The bead formations 20 and 21 are formed by turning the longitudinal edges of the body inwardly so as to provide shallow grooves 22 and 23 facing each other as shown clearly in Figure 6. The molding may be constructed in the form just described with substantial economy in metal. The relatively wide inturned flanges ordinarily employed and usually provided to facilitate securement of the moldings are made unnecessary by the present invention.

Figures 4, 5:
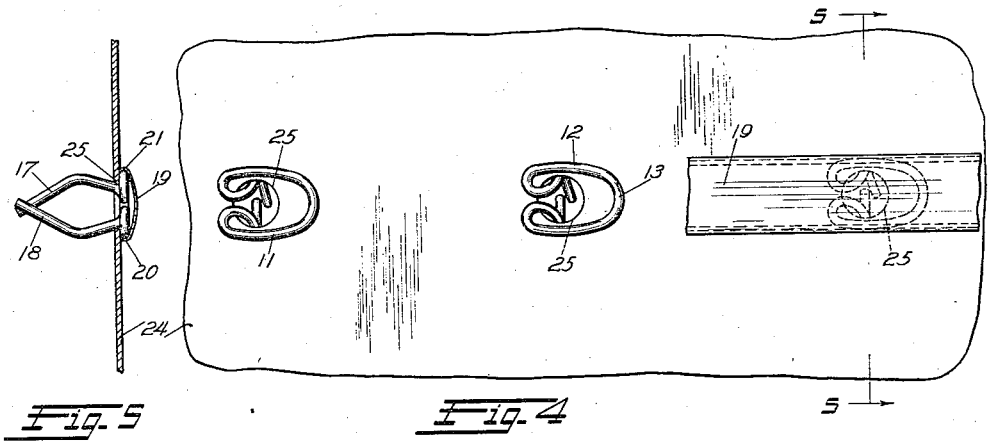
Figure 4 is a fragmentary plan view showing the way of using the fastener of the present invention when it is desired to snap the molding on the fastener heads after the fasteners have
Figure 5 is a sectional view taken on the plane indicated by the line 5—5 in Figure 4 looking in the direction of the arrow.
Figures 7, 8:
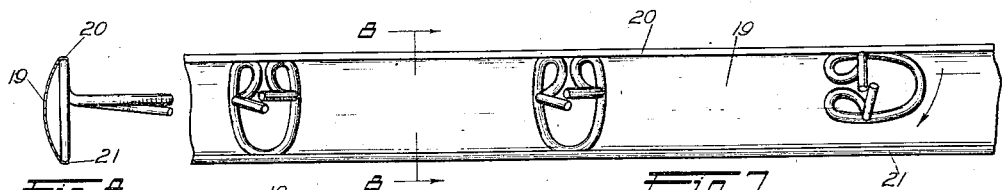
Figure 7 is a view of a section of molding and a number of fasteners assembled, or partially assembled, with respect thereto illustrating how the fastener forming a part of the present invention is preferably used when the fastener is first assembled with respect to the molding before the latter is applied to the supporting structure in the conventional manner.
Figure 8 is a sectional view of the parts on the plane indicated by the lines 8—8 in Figure 7 looking in the direction of the arrow.

Moldings such as just described may be secured by fasteners already described in the manner illustrated in Figures 4 and 5, or in the manner illustrated in Figures 7 and 8. Referring first to Figures 4 and 5, 24 designates the supporting structure having aligned openings 25 to receive the fasteners utilized in attaching a molding such as already described over said opening. The fasteners are first applied to the structure 24 by inserting the stud parts of the fasteners in the openings. The heads of the fasteners are then aligned so that the straight portions 11 and 12 are parallel to a line passing through the centers of the openings. The outwardly bowed legs 17 and 18 function to draw the heads of the fasteners firmly in contact with the outer surface of the structure 24, said heads protruding away from said surface only to the extent of the thickness of the wire from which the fasteners are constructed.

After the fasteners have been applied and aligned, the molding is engaged with the fastener heads by snapping the molding into engagement with said head. The external width of the heads measured across the relatively straight portions 11 exceeds slightly the internal width of the molding measured between the bottoms of the grooves 22 and 23 formed by the beads 21 and 20, respectively. Accordingly, when the molding is forced over the aligned fastener heads the portions 11 and 12 are forced towards each other and after the under surfaces of the beads 20 and 21 contact with the outer surface of the structure 24 said portions snap into the grooves 22 and 23. The rounded portion 13 of the fastener heads is thus put under stress effective to maintain a firm engagement between the molding and the straight portion to the fastener heads. In view of the fact that the heads of the fasteners are of elongated or ovoidal form engagement is provided between the fasteners and the molding over a relatively great length of its edges and rotation of the fasteners with respect to the molding cannot take place.

Figure 6:
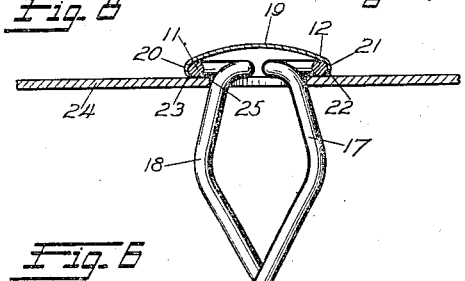
Figure 6 is an enlarged view illustrating clearly the nature of the bead formation in the longitudinal edges of the molding and the mode of cooperation of the edges of the fastener head with said formation.

As clearly illustrated in Figure 6, the beads 20 and 21 are formed of a width corresponding to the diameter of the wire from which the fastener is constructed and of a depth corresponding only to the radius of said wire. As a consequence, the under surface of the head of the fastener and the under surfaces of the blade formations are disposed substantially in the plane of the structure 24 when the molding is secured in position.

Fasteners of the same type can also be conveniently used to secure moldings of the type already described by first assembling the fasteners with respect to the moldings and subsequently engaging the stud or shank parts of the fasteners with the openings in the supporting structure, this mode of procedure being likewise frequently followed in the attachment of moldings by means of snap fasteners. When the fasteners of the present invention are used in accordance with the method just stated, the procedure illustrated in Figures 7 and 8 is followed. In order that fasteners of the present invention may be used in securing moldings by the latter method the length of the ovoidal head is made slightly greater than the width of the molding measured from between the bottoms of the grooves 22 and 23, and the heads are somewhat narrower than the internal width of the molding measured in the plane of the under surfaces of the beads.

The fasteners are assembled with respect to the molding by arranging the head so that the major dimension thereof extends in the direction of the length of molding as illustrated at the right of Figure 7. The fastener is then turned through an angle of ninety degrees to the position occupied by the fasteners illustrated at the center and left of said figure. The rounded corner provided by the curved portion 13 of the head permits the rotation of the fastener into the latter position. In said position the fastener fits snugly between the opposite beads and provides a three-point contact between molding and fastener, the curved portion contacting with one bead of the molding at one point, and the curved portions 14 of the head contacting with the other bead at two spaced points.

After the required number of fasteners have been applied in the manner just stated at properly spaced intervals the molding is ready to be applied to the supporting structure by engaging the protruding shanks thereof with the openings in said structure in a manner well understood in the art. In its final position the under surfaces of the beads and the under surfaces of the heads of the fasteners are disposed substantially in the same plane as when the fasteners are applied in accordance with the method first described.

Figure 9:
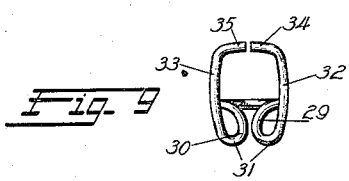
Figures 9, 10 and 11 are plan, side and end views of a modified form of spring stud fastener.
Figures 2, 3:
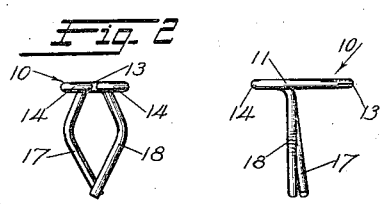
Figures 10, 11:
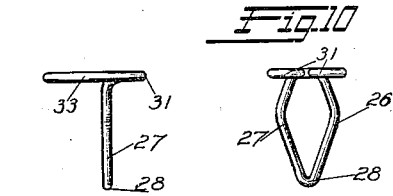

Instead of constructing the fastener as illustrated in Figures 1, 2 and 3 it may be constructed in the form illustrated in Figures 9, 10 and 11 in which the shank is constructed from the midportion of a piece of wire while the head is formed from the ends thereof. Referring to these figures the shank comprises a pair of outwardly bowed legs 26 and 27 connected at the end 28 of the shank. The ends of the wire are then bent into the form illustrated best in Figure 9 providing spaced arms 29 and 30 in the plane of the head, curved portions 31, relatively straight portions 32 and 33, the ends of which 34 and 35 are bent towards each other providing, as in the form of the invention first described, an ovoidal head. Preferably the portions 34 and 35 are spaced apart, though, if desired, they may be normally in contact, the degree of flexibility of the head dependent upon whether or not these portions contact, the head being much stiffer when said portions contact.

It will be understood that the modified form of fastener illustrated in Figures 9, 10 and 11 will be used in precisely the same manner as that first described. The fastener of these figures, like that first described, is first bent to the appropriate form and after the fastener has assumed its desired form the wire is properly tempered whereby every part of the fastener is made resilient.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A molding ready for application to a support having apertures, comprising a molding having rounded beads along its longitudinal edges, said beads opening toward each other and having a depth less than half the width thereof, and spring stud fasteners having resilient heads constructed in ovoidal form from round wire of a diameter corresponding to the width of said beads and extending across said molding between the beads with the major axis of the ovoidal heads disposed transversely of the molding; the minor axis of the heads being of such dimension that when the head is turned with its minor axis transverse to the molding it can be readily inserted within the molding and then turned until the major axis is compressed within said beads with the under surfaces of said heads being disposed substantially in a plane passing through the bearing surfaces of said beads.

BION C. PLACE.